(12) United States Patent
Nojiri et al.

(10) Patent No.: US 12,246,396 B2
(45) Date of Patent: Mar. 11, 2025

(54) ADDITIVE MANUFACTURING APPARATUS AND MACHINING HEAD

(71) Applicant: Mitsubishi Electric Corporation, Tokyo (JP)

(72) Inventors: Yuji Nojiri, Tokyo (JP); Kazuya Horio, Tokyo (JP); Satoshi Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/721,893

(22) PCT Filed: Mar. 11, 2022

(86) PCT No.: PCT/JP2022/011007
§ 371 (c)(1),
(2) Date: Jun. 20, 2024

(87) PCT Pub. No.: WO2023/170950
PCT Pub. Date: Sep. 14, 2023

(65) Prior Publication Data
US 2024/0416455 A1    Dec. 19, 2024

(51) Int. Cl.
*B23K 26/342*    (2014.01)
*B23K 26/14*    (2014.01)
(Continued)

(52) U.S. Cl.
CPC ........ *B23K 26/342* (2015.10); *B23K 26/1462* (2015.10); *B33Y 30/00* (2014.12)

(58) Field of Classification Search
CPC .............. B23K 26/342; B23K 26/1462; B23K 26/1464
See application file for complete search history.

(56) References Cited

U.S. PATENT DOCUMENTS 10,449,560 B2    10/2019    Ohno et al.
2012/0037604 A1    2/2012    Shikata
(Continued)

FOREIGN PATENT DOCUMENTS

JP    S59-180880 U    12/1984
JP    2000-271778 A    10/2000
(Continued)

OTHER PUBLICATIONS

International Search Report and Written Opinion mailed on May 31, 2022, received for PCT Application PCT/JP2022/011007, filed on Mar. 11, 2022, 10 pages including English Translation.
(Continued)

*Primary Examiner* — Geoffrey S Evans
(74) *Attorney, Agent, or Firm* — XSENSUS LLP

(57) ABSTRACT

An additive manufacturing apparatus including: a wire nozzle that feeds a wirelike material onto a workpiece; and a machining head that irradiates the material fed onto the workpiece with a laser beam, and jets shielding gas from a supply source of the shielding gas. The machining head includes: a pipeline having a cylindrical shape and extending in a traveling direction of the laser beam, the laser beam being passed through the pipeline; and a gas supply port from which the shielding gas from the supply source is supplied to the pipeline.

11 Claims, 5 Drawing Sheets

(51) Int. Cl.
*B23K 26/146* (2014.01)
*B33Y 30/00* (2015.01)

(56) References Cited

U.S. PATENT DOCUMENTS

2020/0391405 A1* 12/2020 Mahjouri-Samani ........................ B23K 26/1464
2021/0316368 A1   10/2021 Morita et al.

FOREIGN PATENT DOCUMENTS

| JP | 2008-114275 A | 5/2008 |
| JP | 6552771 B1 | 7/2019 |
| WO | 2010/113244 A1 | 10/2010 |
| WO | 2016/135907 A1 | 9/2016 |

OTHER PUBLICATIONS

Decision to Grant mailed on Oct. 4, 2022, received for JP Application 2022-547313, 5 pages including English Translation.

* cited by examiner

ADDITIVE MANUFACTURING APPARATUS AND MACHINING HEAD

CROSS-REFERENCE TO RELATED APPLICATION

This application is a national stage application, pursuant to 35 U.S.C. § 371, of International Patent Application No. PCT/JP2022/011007, filed Mar. 11, 2022.

FIELD

The present disclosure relates to an additive manufacturing apparatus and a machining head that manufacture a shaped object by irradiating a material supplied onto a workpiece with a laser beam to melt the material and solidify the material.

BACKGROUND

An additive manufacturing apparatus is an apparatus that manufactures a shaped object by stacking, on a workpiece, machining objects obtained by the melting and solidifying of a metallic material supplied onto the workpiece by means of a heat source. Since a machining object is exposed to the air at a high temperature during machining, the machining object is likely to be oxidized. When the machining object is oxidized, the quality of a shaped object may deteriorate, or machining may become unstable. In particular, since machining objects are stacked when machined by the additive manufacturing apparatus, the machining objects are likely to store heat. In addition, it generally takes several hours for the machining of each single machining object. Therefore, machining objects tend to be easily oxidized when machined by the additive manufacturing apparatus as compared with a case where a machining method such as build-up welding is used.

Accordingly, as one of the methods for preventing oxidation of a machining object, a method is conventionally used in which an inert gas is jetted as shielding gas toward a machining point to shield the machining point from the air, that is, oxygen. However, when the shielding gas jetted out of the gas nozzle is flowing as a turbulent flow, the air, that is, oxygen is entrained in the shielding gas, thereby facilitating oxidation. Therefore, there is a demand for a gas nozzle capable of preventing generation of a turbulent flow.

Patent Literature 1 discloses a beam machining nozzle including a light beam path constituent member and a flow path constituent member. The light beam path constituent member forms a light beam path through which a light beam such as a laser beam passes. The flow path constituent member is provided around the light beam path constituent member, and has a gas flow path through which carrier gas containing powder flows. In the beam machining nozzle described in Patent Literature 1, a light beam passes through the light beam path formed by the light beam path constituent member, and is emitted from a tip of the beam machining nozzle toward a workpiece, and the carrier gas containing powder passes through the gas flow path formed by the flow path constituent member, and is jetted out of the tip of the beam machining nozzle toward the workpiece.

CITATION LIST

Patent Literature

Patent Literature 1: WO 2016/135907 A

SUMMARY OF INVENTION

Problem to be Solved by the Invention

Incidentally, in a case where the carrier gas containing powder is caused to flow in the same path as the light beam, the powder is melted by the light beam in the path. Therefore, a machining head has a structure in which a light beam path and a gas flow path are separately provided, as in the technique described in Patent Literature 1. When the light beam path and the gas path are separately provided, the machining head becomes complicated. In addition, there is a problem in that since the carrier gas is supplied in an axis separate from the light beam path, the effect of straightening gas is impaired, causing a turbulent flow at a position where the light beam is applied.

The present disclosure has been made in view of the above, and an object of the present disclosure is to provide an additive manufacturing apparatus capable of preventing generation of a turbulent flow of gas with a structure simpler than the conventional ones when performing machining by supplying the gas while irradiating a material supplied to a workpiece with a laser beam.

Means to Solve the Problem

In order to solve the above-stated problems and achieve the object, an additive manufacturing apparatus according to the present disclosure comprises: a wire nozzle to feed a wirelike material onto a workpiece; and a machining head to irradiate the material fed onto the workpiece with a laser beam, and jet shielding gas from a supply source of the shielding gas. The machining head includes: a pipeline having a cylindrical shape and extending in a traveling direction of the laser beam, the laser beam being passed through the pipeline; and a gas supply port from which the shielding gas from the supply source is supplied to the pipeline.

Effects of the Invention

The additive manufacturing apparatus according to the present disclosure can achieve an effect of preventing generation of a turbulent flow of gas with a structure simpler than the conventional ones when performing machining by supplying the gas while irradiating a material supplied to a workpiece with a laser beam.

DESCRIPTION OF EMBODIMENTS

Hereinafter, an additive manufacturing apparatus and a machining head according to embodiments of the present disclosure will be described in detail with reference to the drawings.

First Embodiment

Figure 1:
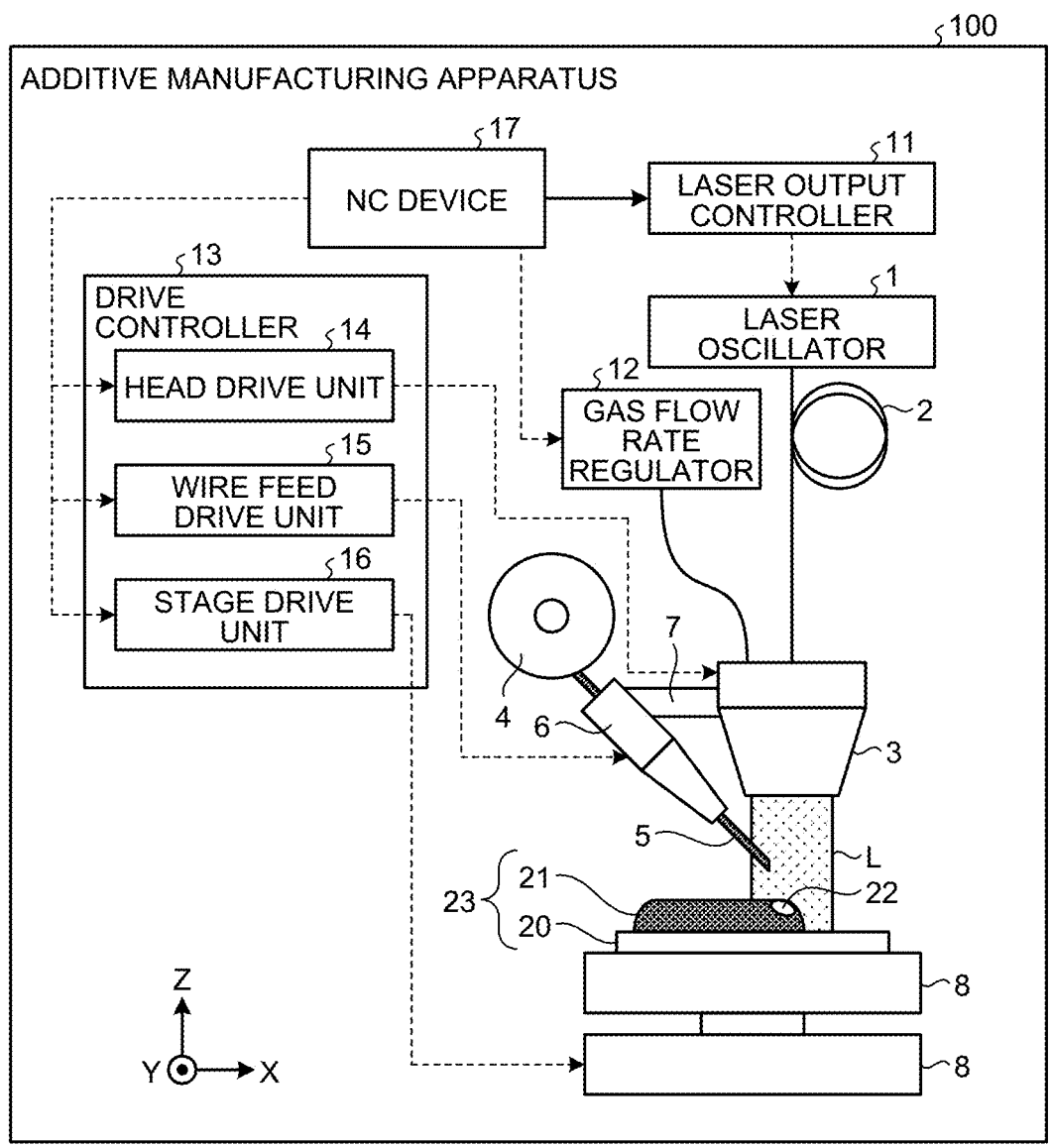
FIG. 1 is a diagram illustrating a configuration of an additive manufacturing apparatus according to a first embodiment.

FIG. 1 is a diagram illustrating a configuration of an additive manufacturing apparatus according to a first embodiment. An additive manufacturing apparatus 100 is a machine tool that manufactures a three-dimensionally shaped object by adding molten filler metal to a workpiece 23. The additive manufacturing apparatus 100 melts the filler metal by applying a heat source. In the first embodiment, the heat source is a laser beam L. Furthermore, in the first embodiment, the filler metal is a wirelike metallic material.

The additive manufacturing apparatus 100 forms a bead 21 by locally melting, with the laser beam L, a tip of wire 5 fed as filler metal to the workpiece 23 and bringing the molten portion of the wire 5 into contact with the workpiece 23. The bead 21 is a solidified product of the wire 5 melted by being irradiated with the laser beam L. The additive manufacturing apparatus 100 manufactures a shaped object by stacking the beads 21 on a substrate 20. The substrate 20 illustrated in FIG. 1 is a plate substrate. The substrate 20 may be other than the plate substrate. The workpiece 23 is an object to which molten filler metal is to be added, and corresponds to the substrate 20, or the bead 21 on the substrate 20. A molten bead 22 is a molten portion of the bead 21.

An X-axis, a Y-axis, and a Z-axis are three axes perpendicular to each other. The X-axis and the Y-axis are horizontal axes. The Z-axis is a vertical axis. A Z-axis direction is a stacking direction in which the beads 21 are stacked.

The additive manufacturing apparatus 100 includes a laser oscillator 1, a laser output controller 11, a machining head 3, a gas flow rate regulator 12, a wire spool 4, a wire nozzle 6, a stage 8, a drive controller 13, and a numerical control (NC) device 17.

The laser oscillator 1 outputs the laser beam L as a heat source. The laser beam L output from the laser oscillator 1 is transmitted to the machining head 3 through a fiber cable 2 that is an optical transmission line. The laser output controller 11 adjusts the laser output of the laser oscillator 1, which is the output of the laser beam L, by controlling the laser oscillator 1.

The machining head 3 is connected to the fiber cable 2 via a connector (not illustrated), and emits the laser beam L toward the workpiece 23. The machining head 3 is movable in each of an X-axis direction, a Y-axis direction, and the Z-axis direction. The machining head 3 includes a collimating optical system and a condenser lens. The collimating optical system collimates the laser beam L. The condenser lens focuses the laser beam L. The collimating optical system and the condenser lens are not illustrated. The direction of a center line of the laser beam L to be applied to the workpiece 23 is the Z-axis direction.

The machining head 3 includes a gas nozzle out of which shielding gas is jetted toward the workpiece 23. The shielding gas is a gas that prevents oxidation due to application of the laser beam L at a machining point. An inert gas such as nitrogen gas or argon gas is used as the shielding gas. Oxidation of the bead 21 is prevented and the formed bead 21 is cooled by the jet of the shielding gas. The shielding gas is supplied from a gas cylinder which is a supply source of the shielding gas. The gas flow rate regulator 12 regulates the flow rate of the shielding gas. The gas nozzle and the gas cylinder are not illustrated. As described above, in the first embodiment, the machining head 3 irradiates the wire 5 supplied onto the workpiece 23 with the laser beam L, and also jets the shielding gas from the supply source of the shielding gas.

The wire spool 4 is a supply source of the wire 5. The wire 5 is wound around the wire spool 4. The wire nozzle 6 is fixed to the machining head 3 by a support member 7. Therefore, the wire nozzle 6 moves together with the machining head 3. The wire nozzle 6 feeds the wire 5 to the workpiece 23. The wire nozzle 6 feeds the wire 5 from the wire spool 4 toward the workpiece 23. In addition, the wire nozzle 6 pulls the fed wire 5 back toward the wire spool 4. A direction in which the wire 5 is fed is a direction oblique with respect to the direction in which the laser beam L is emitted from the machining head 3.

The stage 8 fixes and supports the substrate 20. In one example, the stage 8 can rotate around the Z-axis and the Y-axis. The inclination of the stage 8 can be changed by rotation of the stage 8 around the Y-axis. That is, the orientation of the substrate 20 fixed to an upper surface of the stage 8 can be changed by movement of the stage 8. The additive manufacturing apparatus 100 moves a point to be irradiated with the laser beam L on the workpiece 23, by changing the orientation of the substrate 20 and moving the machining head 3.

The drive controller 13 includes a head drive unit 14, a wire feed drive unit 15, and a stage drive unit 16. The head drive unit 14 drives the machining head 3. The wire feed drive unit 15 drives the wire nozzle 6. The stage drive unit 16 drives the stage 8.

The NC device 17 controls the entire additive manufacturing apparatus 100 according to a machining program. The NC device 17 controls the laser oscillator 1 by outputting a laser output command to the laser output controller 11. The NC device 17 controls the machining head 3 by outputting an axis command to the head drive unit 14. The NC device 17 controls the wire nozzle 6 by sending a feed command to the wire feed drive unit 15. The NC device 17 controls the stage 8 by outputting a rotation command to the stage drive unit 16. The NC device 17 controls the flow rate of the shielding gas by outputting a gas supply command to the gas flow rate regulator 12.

Figure 2:
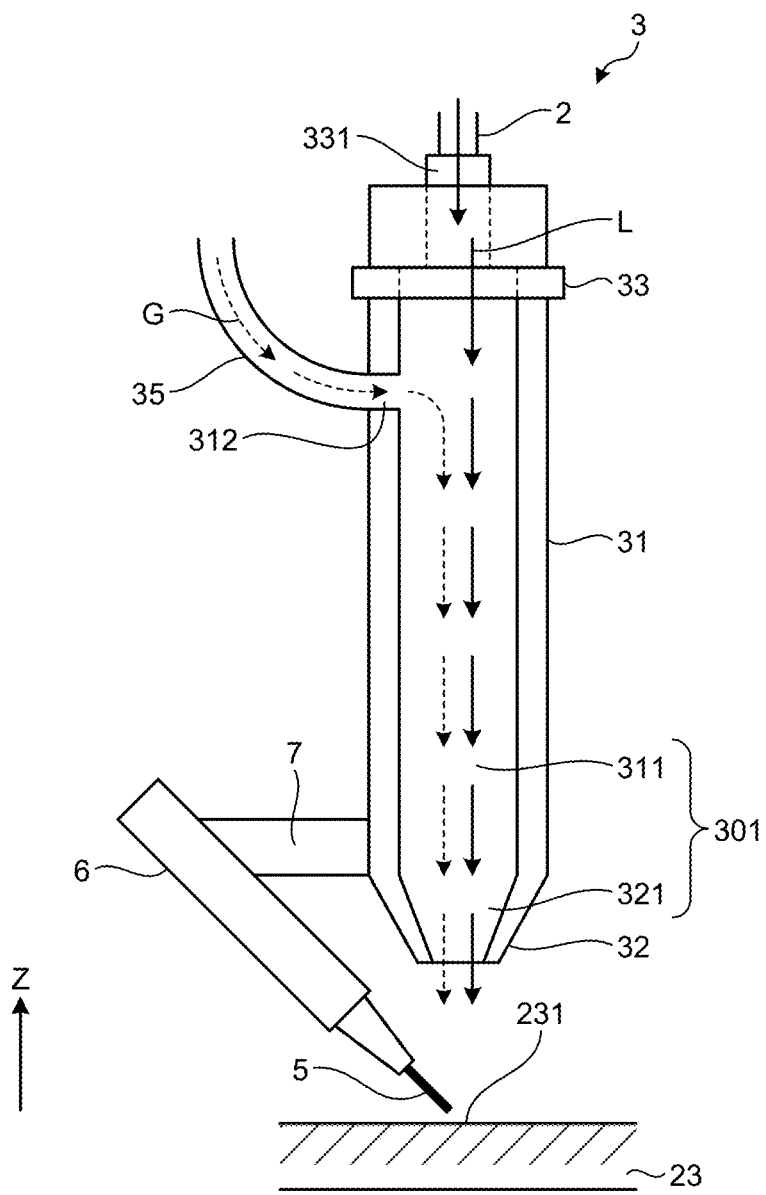
FIG. 2 is a cross-sectional view of a machining head according to the first embodiment, which schematically shows an example of a configuration of the machining head.

Next, a description will be given of the machining head 3 to be used in the additive manufacturing apparatus 100 according to the first embodiment. FIG. 2 is a cross-sectional view of the machining head according to the first embodiment, which schematically shows an example of a configuration of the machining head. The machining head 3 includes a head body 31, a gas jet nozzle 32, and a protective plate 33.

The head body 31 is a cylindrical member having a pipeline 311 extending in the Z-axis direction which is a traveling direction of the laser beam L. In one example, the head body 31 is made of aluminum. Not only the laser beam L but also shielding gas G is passed through the pipeline 311. That is, the laser beam L and the shielding gas G pass through the same pipeline 311. The outer diameter of the head body 31 and the diameter of the pipeline 311 are uniform along the Z-axis direction. The outer shape of the head body 31 and the shape of the pipeline 311 may be a cylindrical shape or a polygonal columnar shape.

A through-hole 312 is formed in an upper portion of the head body 31. The through-hole 312 is a gas supply port from which the shielding gas G is supplied to the pipeline 311. A pipe 35 such as a hose connected to the gas cylinder (not illustrated) is fixed to the through-hole 312 by a connecting member (not illustrated). As a result, the shielding gas G flowing from the through-hole 312 through the pipe 35 is supplied into the pipeline 311 of the head body 31. The through-hole 312 is desirably provided in the upper portion of the head body 31, that is, in the vicinity of a position of incidence of the laser beam L. It is desirable that the distance from an upper surface of the machining head 3 to the through-hole 312 be in the range of ⅓ of the length of the machining head 3 in the Z-axis direction. This is because when the distance from the upper surface of the machining head 3 to the through-hole 312 is outside the range of ⅓ of the length of the machining head 3, it is difficult for the shielding gas G to be straightened before reaching the gas jet nozzle 32 due to a decrease in distance to be traveled by the shielding gas G flowing down in the pipeline 311. In one example, the through-hole 312 is formed in a side surface of the head body 31 by machining. Furthermore, here, the through-hole 312 is formed in a direction perpendicular to the side surface of the head body 31 parallel to the traveling direction of the laser beam L. That is, the through-hole 312 is provided such that the through-hole 312 extends in a direction parallel to a direction perpendicular to the side surface of the head body 31.

The gas jet nozzle 32 is provided at an end of the head body 31 on the side facing the stage 8. The gas jet nozzle 32 is a member that emits the laser beam L toward a machining point 231, and jets the shielding gas G. The machining point 231 is the point to be irradiated with the laser beam L on the workpiece 23, and is a region to which the bead 21 is added. The wire 5 is also fed to the machining point 231 from the wire nozzle 6. The gas jet nozzle 32 is a hollow member having a pipeline 321 extending in the Z-axis direction. The diameter of the pipeline 321 is smaller on the side facing the stage 8 than on the side facing the head body 31. The diameter of the pipeline 321 may be continuously reduced toward the stage 8, or may be reduced in a stepwise manner. In one example, the gas jet nozzle 32 includes a hollow member with a frustum shape. In one example, the gas jet nozzle 32 is made of aluminum. In addition, the gas jet nozzle 32 may be formed integrally with the head body 31, or may be connected to the head body 31 by welding or the like.

Note that a pipeline 301 of the machining head 3 includes the pipeline 311 of the head body 31 and the pipeline 321 of the gas jet nozzle 32.

The protective plate 33 is provided in such a way as to cover an opening of an end of the head body 31 on the side opposite to the gas jet nozzle 32. The protective plate 33 includes a member transparent with respect to the wavelength of the laser beam L. In one example, the protective plate 33 is made of glass. A connector 331 that fixes the fiber cable 2 is provided on an upper surface of the protective plate 33. The protective plate 33 is a member that protects the connector 331 from spatters or fumes to be generated when the additive manufacturing apparatus 100 irradiates the wire 5 with the laser beam L.

As described above, the machining head 3 has the pipeline 301 extending in the Z-axis direction, and has a structure in which the end of the machining head 3 is closed on a side on which the laser beam L is incident. A plane of incidence of the laser beam L corresponds to the protective plate 33.

In FIG. 2, the optical path of the laser beam L is drawn by solid lines, and the flow of the shielding gas G is drawn by chain lines. The laser beam L is guided from the fiber cable 2 to the pipeline 301 of the machining head 3 via the connector 331. Then, the laser beam L moves along the Z-axis direction inside the pipeline 301, and is emitted from a tip of the gas jet nozzle 32. In addition, the shielding gas G is supplied from the through-hole 312 to the pipeline 301 of the machining head 3 via the pipe 35. The shielding gas G flows down from the through-hole 312 toward the gas jet nozzle 32. That is, the shielding gas G flows downward in the Z-axis direction through the same pipeline 301 as the pipeline 301 through which the laser beam L passes. Then, the shielding gas G is jetted out of the gas jet nozzle 32 toward the machining point 231. The shielding gas G supplied through the through-hole 312 is straightened as the shielding gas G flows down the pipeline 301, and is jetted out of the gas jet nozzle 32, but reaches the machining point 231 as a laminar flow.

Since the shielding gas G is supplied in the vicinity of the position of incidence of the laser beam L in the pipeline 301, and the shielding gas G is jetted and the laser beam L is emitted at the same position, the direction of the macroscopic flow of the shielding gas G in the pipeline 301 is parallel to the optical path of the laser beam L. Then, it is considered that the shielding gas G is straightened in the pipeline 301 by flowing down inside the cylindrical pipeline 301.

As a result, while the laser beam L is applied to the machining point 231, the shielding gas G is jetted as a laminar flow into a region including the laser beam L. This prevents generation of a turbulent flow in which the ambient air, that is, oxygen is entrained.

It is known that whether a flow becomes a laminar flow or a turbulent flow can be determined by a Reynolds number. A Reynolds number R is calculated by formula (1) below, where $U_0$ is characteristic velocity, d is the diameter of a jetting port, and v is the kinematic viscosity coefficient of an air current. Note that an average velocity can be used as the characteristic velocity in the case of a fluid flowing in a circular tube.

$$R = U_0 d / v \tag{1}$$

Experiments and simulations show that when the Reynolds number R is set to 10100 or less in a jetting port region of the through-hole 312, the shielding gas G jetted out of the gas jet nozzle 32 forms a laminar flow. That is, when the Reynolds number R exceeds 10100 in the jetting port region of the through-hole 312, the shielding gas G jetted out of the gas jet nozzle 32 may form a turbulent flow. As described above, oxygen is likely to be entrained at the machining point 231 in the case of a turbulent flow, but oxygen is less likely to be entrained in the case of a laminar flow, so that machining quality is improved. Therefore, when the Reynolds number R is 10100 or less in the jetting port region of the through-hole 312, the shielding gas G can be straightened in the pipeline 301 before reaching the gas jet nozzle 32. As shown in formula (1), it is possible to control the Reynolds number R by controlling the characteristic velocity $U_0$ of the shielding gas G or the diameter d of the through-hole 312.

The machining head 3 of the first embodiment includes a cylindrical member having the pipeline 301. The pipeline 301 extends in the traveling direction of the laser beam L, and the laser beam L passes through the pipeline 301. In addition, the machining head 3 has the through-hole 312 connected to the pipe 35 extending from a supply source of the shielding gas G. The shielding gas G is supplied to the pipeline 301 through the through-hole 312. That is, the shielding gas G flows through the same pipeline 301 as the laser beam L. As a result, unlike the conventional technique, it is not necessary to provide a member for forming a flow path through which the shielding gas G flows separately from a pipeline through which the laser beam L passes. Therefore, an inexpensive and simple structure can be achieved. In addition, since the shielding gas G flows down the same pipeline 301 as the laser beam L, the shielding gas G is straightened in the pipeline 301, so that the shielding gas G can be jetted as a laminar flow toward the machining point 231 and thus, oxygen is less likely to be entrained at the machining point 231. Therefore, it is possible to improve machining quality and perform stable machining by forming a laminar flow. That is, the additive manufacturing apparatus according to the present embodiment can achieve an effect of preventing generation of a turbulent flow of the shielding gas G with a structure simpler than the conventional ones when performing machining by supplying the shielding gas G while irradiating the wire 5 supplied to the workpiece 23 with the laser beam L.

In particular, it is possible to straighten the shielding gas G flowing down through the pipeline 301 and cause the shielding gas G jetted toward the machining point 231 to form a laminar flow, by setting the Reynolds number R to 10100 or less in the through-hole 312.

Second Embodiment

Figure 3:
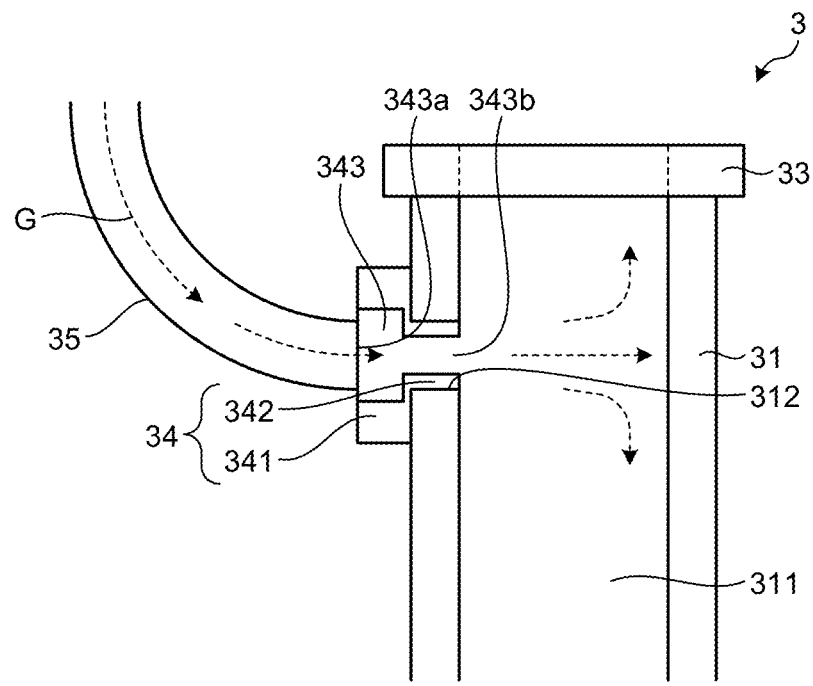
FIG. 3 is a cross-sectional view of a machining head according to a second embodiment, which schematically shows an example of a configuration of a portion in the vicinity of a gas supply nozzle.

FIG. 3 is a cross-sectional view of a machining head according to a second embodiment, which schematically shows an example of a configuration of a portion in the vicinity of a gas supply nozzle. Note that in the following description, the same constituent elements as those in the first embodiment will be denoted by the same reference numerals, and description thereof will be omitted. Thus, a difference from the first embodiment will be described below.

The machining head 3 according to the second embodiment further includes a gas supply nozzle 34 connected to the through-hole 312. The gas supply nozzle 34 is connected to the pipe 35, and includes a pipe connection part 341 and an insertion part 342. The pipe connection part 341 is disposed outside the side surface of the head body 31. The insertion part 342 is inserted into the through-hole 312. The pipe connection part 341 is a plate-like member, and is fixed to the head body 31 by securing members (not illustrated). In one example, the securing members are bolts, and are screwed into screw holes provided in the pipe connection part 341 and the head body 31. The insertion part 342 is connected to one of the surfaces of the pipe connection part 341. In addition, an internal flow path 343 is provided in such a way as to penetrate the pipe connection part 341 and the insertion part 342. An inlet 343a of the internal flow path 343 is provided in the pipe connection part 341, and an outlet 343b is provided in the insertion part 342. The diameter of the outlet 343b is smaller than the diameter of the inlet 343a. Here, an example is shown in which the diameter of the internal flow path 343 is reduced in a stepwise manner in the vicinity of a boundary between the pipe connection part 341 and the insertion part 342, but the diameter of the internal flow path 343 may be continuously reduced. The outlet 343b of the gas supply nozzle 34 corresponds to a gas supply port. Furthermore, the inlet 343a and the outlet 343b of the gas supply nozzle 34 are located at the same position in the traveling direction of the laser beam L. More specifically, the centers of the inlet 343a and the outlet 343b of the gas supply nozzle 34 are located at the same position in the traveling direction of the laser beam L.

Since the diameter of the outlet 343b is smaller than the diameter of the inlet 343a in the gas supply nozzle 34, the flow speed of the shielding gas G jetted out of the gas supply nozzle 34 is larger than the flow speed of the shielding gas G flowing through the pipe 35. As a result, assuming that the flow speed of the shielding gas G flowing through the pipe 35 is unchanged and the gas supply nozzle 34 is not provided, the percentage of the shielding gas G flowing from the through-hole 312 and colliding with a wall surface of the pipeline 301 facing the through-hole 312 is small, but when the gas supply nozzle 34 is provided, the shielding gas G collides with the wall surface of the pipeline 301 facing the outlet 343b. When the shielding gas G collides with the inner wall surface of the pipeline 301, the shielding gas G is diffused, and dynamic pressure temporarily decreases to cause the flow speed to decrease. Then, speed distribution in the pipeline 301 becomes uniform. That is, since there is no ununiformity in the speed distribution in the pipeline 301, straightening effect is enhanced. As a result, the shielding gas G jetted out of the gas jet nozzle 32 reaches the machining point 231 as a laminar flow.

In general, in order for a jet flow to form not a turbulent flow but a laminar flow, any of the following means is taken: reducing the flow rate of the shielding gas G, increasing the diameter of the opening of the machining head 3, or straightening the shielding gas G in the machining head 3. However, in order to ensure shielding performance, it is necessary to ensure a constant flow rate. Furthermore, an increase in the diameter of the opening of the machining head 3 causes increasing concern about, for example, collision with a shaped object during shaping process. Thus, the diameter of the opening cannot be increased without careful consideration. Moreover, in a case where straightening is performed in the machining head 3, a diffuser panel or a filter is widely used. However, in the machining head 3 according to the second embodiment, the laser beam L is also passed through the pipeline 301 together with the shielding gas G. Therefore, it is not possible to use a diffuser panel or a filter because the optical path of the laser beam L is blocked by the diffuser panel or the filter.

In the second embodiment, the gas supply nozzle 34 in which the diameter of the outlet 343b is smaller than the diameter of the inlet 343a is provided in the through-hole 312. As a result, the jet flow of the shielding gas G from the gas supply nozzle 34 collides with the inner wall of the pipeline 301 facing the gas supply nozzle 34 to make the speed distribution of the shielding gas G uniform in the pipeline 301. Thus, straightening effect can be further enhanced as compared with the case of the first embodiment. As a result, the shielding gas G can be guided to the machining point 231 as a laminar flow.

Although a case where the gas supply nozzle 34 is provided in the through-hole 312 has been illustrated in FIG. 3, it is possible to obtain the same effect by increasing the flow speed of the shielding gas G with the configuration of the machining head 3 of the first embodiment illustrated in FIG. 2 or with the configuration using the gas supply nozzle 34 in which the diameter of the outlet 343*b* is equal to the diameter of the inlet 343*a* in FIG. 3. In addition, it is assumed that the shielding gas G does not collide with the wall surface of the pipeline 301 facing the through-hole 312 in a case where the shielding gas G is caused to flow at a certain flow speed with the configuration of the machining head 3 of the first embodiment illustrated in FIG. 2, in which no gas supply nozzle 34 is provided, or with the configuration using the gas supply nozzle 34 in which the diameter of the outlet 343*b* is equal to the diameter of the inlet 343*a* in FIG. 3. In this case, it is possible to cause the shielding gas G jetted out of the through-hole 312 to collide with the wall surface of the pipeline 301 facing the through-hole 312 even at the same flow speed, by replacing the machining head 3 with the machining head 3 including the pipeline 301 with a small diameter. As described above, it is also possible to obtain the same effect by reducing the diameter of the pipeline 301 of the machining head 3. Furthermore, also in the second embodiment, the Reynolds number R is set to 10100 or less in a jetting port region of the gas supply nozzle 34. As a result, the shielding gas G forms a laminar flow at the machining point 231.

Third Embodiment

Figure 4:
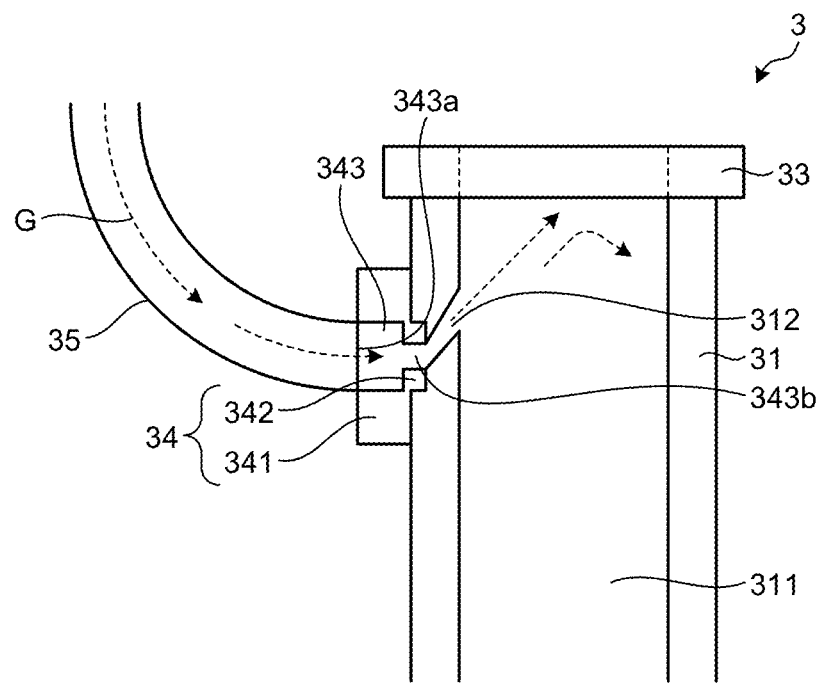
FIG. 4 is a cross-sectional view of a machining head according to a third embodiment, which schematically shows an example of a configuration of a portion in the vicinity of a gas supply nozzle.

FIG. 4 is a cross-sectional view of a machining head according to a third embodiment, which schematically shows an example of a configuration of a portion in the vicinity of a gas supply nozzle. Note that in the following description, the same constituent elements as those in the first and second embodiments will be denoted by the same reference numerals, and description thereof will be omitted. Thus, a difference from the first and second embodiments will be described below.

In the machining head 3 according to the third embodiment, the through-hole 312 provided in the side surface of the head body 31 is formed by a flow path extending obliquely upward. That is, the position of the through-hole 312 facing the pipeline 311 is located above the position of the through-hole 312 facing the outside of the head body 31. Specifically, the position of the center of the through-hole 312 facing the pipeline 311 is located above the position of the center of the through-hole 312 facing the outside of the head body 31. A case where the gas supply nozzle 34 is provided is shown as an example in FIG. 4. The through-hole 312 has an opening the size of which is sufficient to allow the insertion part 342 of the gas supply nozzle 34 to be inserted into the opening. In addition, the through-hole 312 has another opening having a diameter smaller than the diameter of the opening and extending obliquely upward from an end of the opening.

With such a structure of the through-hole 312, the shielding gas G jetted out of the gas supply nozzle 34 collides with the upper surface of the machining head 3, which is the plane of incidence of the laser beam L, that is, the protective plate 33 disposed on the upper portion of the head body 31. In the third embodiment as well, the shielding gas G is caused to collide with the protective plate 33. Therefore, the speed distribution of the shielding gas G in the pipeline 301 can be made uniform as in the second embodiment. In addition, experiments and simulations show that when the shielding gas G is caused to collide with the upper surface of the machining head 3, ununiformity of the shielding gas G with respect to the cross section in the pipeline 301 is reduced as compared with a case where the shielding gas G is caused to collide with the wall surface of the pipeline 301 facing the through-hole 312, so that a result is obtained in which the effect of straightening in the pipeline 301 is high.

According to the third embodiment, it is possible to uniformly deliver the shielding gas G to a jetting port surface corresponding to an end surface of the gas jet nozzle 32 by causing the shielding gas G to collide with the upper surface of the machining head 3. As a result, it is possible to enhance the effect of straightening the shielding gas G in the pipeline 301 of the machining head 3 as compared with the case of the second embodiment. Then, as compared with the case of the second embodiment, the shielding gas G can be supplied to the machining point 231 as a laminar flow with a straightening effect that has been enhanced. Furthermore, also in the third embodiment, the Reynolds number R is set to 10100 or less in the jetting port region of the gas supply nozzle 34. As a result, the shielding gas G forms a laminar flow at the machining point 231.

Note that although FIG. 4 illustrates a case where the gas supply nozzle 34 is provided such that the internal flow path 343 is perpendicular to the side surface of the head body 31, the gas supply nozzle 34 may be attached obliquely to a side surface of the machining head 3 such that the internal flow path 343 extends toward the upper surface of the machining head 3. Furthermore, the machining head 3 may have a structure in which the gas supply nozzle 34 is not provided and instead, the pipe 35 is connected to the through-hole 312.

Fourth Embodiment

Figure 5:
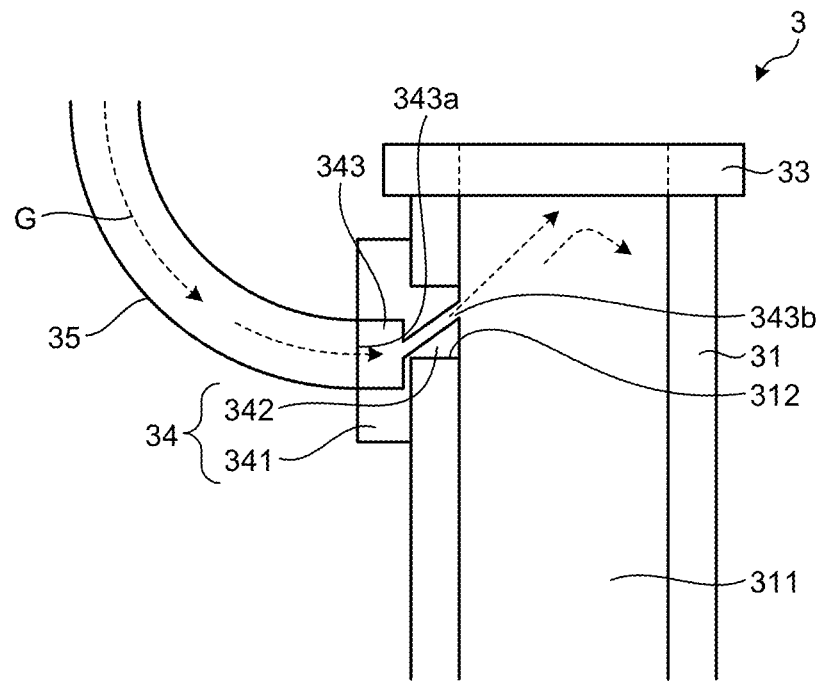
FIG. 5 is a cross-sectional view of a machining head according to a fourth embodiment, which schematically shows an example of a configuration of a portion in the vicinity of a gas supply nozzle.
Figure 6:
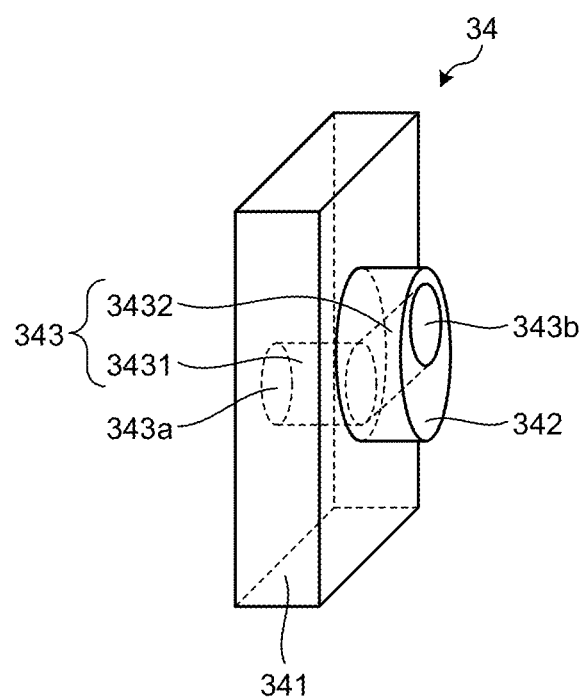
FIG. 6 is a perspective view of the gas supply nozzle of the machining head according to the fourth embodiment, which shows an example of a configuration of the gas supply nozzle.

FIG. 5 is a cross-sectional view of a machining head according to a fourth embodiment, which schematically shows an example of a configuration of a portion in the vicinity of a gas supply nozzle. FIG. 6 is a perspective view of the gas supply nozzle of the machining head according to the fourth embodiment, which shows an example of a configuration of the gas supply nozzle. Note that in the following description, the same constituent elements as those in the first to third embodiments will be denoted by the same reference numerals, and description thereof will be omitted. Thus, a difference from the first to third embodiments will be described below.

In the fourth embodiment, the through-hole 312 of the head body 31 of the machining head 3 is similar to the through-holes 312 of the first and second embodiments. That is, the through-hole 312 is formed by a flow path perpendicular to the side surface of the head body 31. That is, the position of the through-hole 312 in an outer surface of the head body 31 coincides with the position of the through-hole 312 in an inner surface of the head body 31.

Meanwhile, in the fourth embodiment, at least part of the internal flow path 343 of the gas supply nozzle 34 is configured in such a way as to extend obliquely upward. The internal flow path 343 extends in a direction perpendicular to the side surface of the head body 31 in the pipe connection part 341, but extends obliquely upward in the insertion part 342 such that the outlet 343*b* of the internal flow path 343 is located above the inlet 343*a*. That is, the internal flow path 343 includes a first flow path component 3431 and a second flow path component 3432. The first flow path component 3431 extends in a direction perpendicular to the side surface of the head body 31. The second flow path component 3432 is connected to the first flow path component 3431, and extends obliquely upward.

It is possible to cause the shielding gas G to collide with the upper surface of the machining head 3, and make the speed distribution of the shielding gas G in the pipeline 301 uniform, as in the second and third embodiments, by connecting the gas supply nozzle 34 having such a configuration to the through-hole 312 of the head body 31 and to the pipe 35.

As described above, since the laser beam L also passes through the pipeline 301 together with the shielding gas G, a plate or the like for guiding the shielding gas G cannot be provided in the pipeline 301. Therefore, the internal flow path 343 extending obliquely upward is formed in the gas supply nozzle 34, and the shielding gas G is jetted into the pipeline 301 of the machining head 3. As a result, it is possible to easily and inexpensively apply the shielding gas G to the upper surface of the machining head 3 without the need for any additional component in the pipeline 301. As a result, the same effect as that in the third embodiment can also be obtained in the fourth embodiment. Furthermore, also in the fourth embodiment, the Reynolds number R is set to 10100 or less in the jetting port region of the gas supply nozzle 34. As a result, the shielding gas G forms a laminar flow at the machining point 231.

Fifth Embodiment

Figure 7:
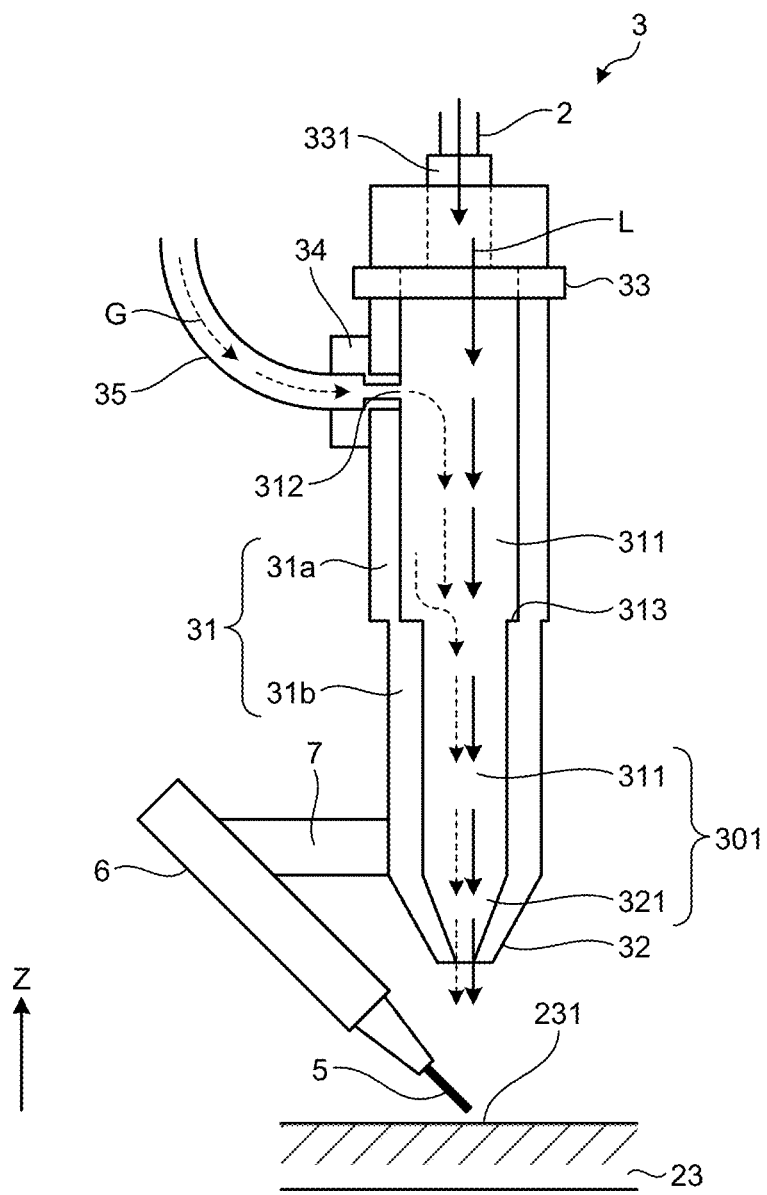
FIG. 7 is a cross-sectional view of a machining head according to a fifth embodiment, which schematically shows an example of a configuration of the machining head.

FIG. 7 is a cross-sectional view of a machining head according to a fifth embodiment, which schematically shows an example of a configuration of the machining head. Note that in the following description, the same constituent elements as those in the first to fourth embodiments will be denoted by the same reference numerals, and description thereof will be omitted. Thus, a difference from the first to fourth embodiments will be described below.

The machining head 3 according to the fifth embodiment is different in the structure of the head body 31 from the machining head 3 of the first embodiment. That is, the head body 31 includes a reduction part 313 to reduce the cross-sectional area of the flow path, that is, the pipeline 311 in a stepwise manner in a path from the gas supply nozzle 34 to the gas jet nozzle 32.

In the example shown in FIG. 7, the head body 31 includes a first body component 31a, a second body component 31b, and the reduction part 313. The first body component 31a has the through-hole 312. The second body component 31b is smaller in the cross-sectional area of the pipeline 311 than the first body component 31a. The reduction part 313 is provided at a boundary between the first body component 31a and the second body component 31b, and causes the cross-sectional area of the pipeline 311 to change in a stepwise manner. The gas jet nozzle 32 is provided at an end of the second body component 31b. The reduction part 313 is a pipeline constituent member that has a surface perpendicular to a direction in which the head body 31 extends, and connects the first body component 31a and the second body component 31b.

The shielding gas G in the pipeline 301 of the machining head 3 has a component flowing downstream along the inner wall surface of the pipeline 301. When the shielding gas G reaches the gas jet nozzle 32 along the inner wall surface of the pipeline 301, ununiformity occurs with respect to the jetting port surface of the gas jet nozzle 32, which causes a turbulent flow. In addition, simulations show that the component of the shielding gas G flowing along the inner wall surface of the pipeline 301 has a high flow speed, and is likely to cause a turbulent flow. Therefore, it is desirable to remove the component flowing along the inner wall surface of the pipeline 301 as much as possible. Therefore, the reduction part 313 is provided in the head body 31 as illustrated in FIG. 7. As a result, the reduction part 313 serves as a barrier against the component of the shielding gas G flowing along the inner wall surface of the pipeline 301, and removes the component of the shielding gas G flowing along the inner wall surface of the pipeline 301. That is, the component of the shielding gas G flowing along the inner wall surface of the pipeline 301 is prevented from directly reaching the gas jet nozzle 32. As a result, the shielding gas G is more uniformly supplied to the jetting port surface of the gas jet nozzle 32. Thus, straightening effect can be enhanced.

FIG. 7 illustrates a case where the head body 31 includes a single reduction part 313, but may include two or more reduction parts 313. In this case, a plurality of the reduction parts 313 are provided such that the cross-sectional area of the pipeline 311 decreases in a stepwise manner from the gas supply nozzle 34 toward the gas jet nozzle 32.

In addition, although FIG. 7 illustrates a case where the outer diameter of the head body 31 also decreases at the reduction part 313, together with the cross-sectional area of the pipeline 311, from the gas supply nozzle 34 toward the gas jet nozzle 32, the configuration of the machining head 3 according to the fifth embodiment is not limited thereto as long as the cross-sectional area of the pipeline 311 decreases. Therefore, the machining head 3 according to the fifth embodiment may be configured such that the outer diameter of the head body 31 is constant and the cross-sectional area of the pipeline 311 decreases, from the gas supply nozzle 34 to a connection part for connection with the gas jet nozzle 32.

Furthermore, although FIG. 7 illustrates a case where the reduction part 313 is provided in the machining head 3 of the second embodiment, the reduction part 313 may be provided in the machining head 3 of the first, third, or fourth embodiment.

In the fifth embodiment, the machining head 3 has the reduction part 313 to reduce the cross-sectional area of the pipeline 301 in a stepwise manner from the gas supply nozzle 34 toward the gas jet nozzle 32. As a result, it is possible to remove the component of the shielding gas G flowing along the inner wall surface of the pipeline 301, which is likely to cause a turbulent flow, so that straightening effect can be further enhanced as compared with the first to fourth embodiments. Thus, the shielding gas G can be more uniformly supplied to the jetting port surface of the gas jet nozzle 32. As a result, the shielding gas G can be supplied to the machining point 231 as a laminar flow. Furthermore, also in the fifth embodiment, the Reynolds number R is set to 10100 or less in the jetting port region of the gas supply nozzle 34. As a result, the shielding gas G forms a laminar flow at the machining point 231.

The configurations set forth in the above embodiments show examples, and it is possible to combine the configurations with another known technique or combine the embodiments with each other, and is also possible to partially omit or change the configurations without departing from the scope of the present disclosure.

REFERENCE SIGNS LIST 1 laser oscillator; 2 fiber cable; 3 machining head; 4 wire spool; 5 wire; 6 wire nozzle; 7 support member; 8 stage; 11 laser output controller; 12 gas flow rate regulator; 13 drive controller; 14 head drive unit; 15 wire feed drive unit; 16 stage drive unit; 17 NC device; 20 substrate; 21 bead; 22 molten bead; 23 workpiece; 31 head body; 31a first body component; 31b second body component; 32 gas jet nozzle; 33 protective plate; 34 gas supply nozzle; 35 pipe; 100 additive manufacturing apparatus; 231 machining point; 301, 311, 321 pipeline; 312 through-hole; 313 reduction part; 331 connector; 341 pipe connection part; 342 insertion part; 343 internal flow path; 343a inlet; 343b outlet; 3431 first flow path component; 3432 second flow path component; G shielding gas; L laser beam.

The invention claimed is:

1. An additive manufacturing apparatus comprising:
   a wire nozzle to feed a wirelike material onto a workpiece; and
   a machining head to irradiate the material fed onto the workpiece with a laser beam, and jet shielding gas from a supply source of the shielding gas, wherein
   the machining head includes:
   a head body including a first pipeline and a gas supply port, the first pipeline having a cylindrical shape and extending in a traveling direction of the laser beam, the laser beam being passed through the first pipeline, the shielding gas from the supply source being supplied from the gas supply port to the first pipeline; and
   a gas jet nozzle provided at an end of the head body facing the workpiece and including a second pipeline, a diameter of the second pipeline being smaller on a side facing the workpiece than on a side facing the head body, and
   a distance from the gas supply port in the head body to a connection part is larger than a length of the gas jet nozzle in the traveling direction of the laser beam, the head body and the gas jet nozzle being connected at the connection part.

2. The additive manufacturing apparatus according to claim 1, wherein the gas supply port is a through-hole penetrating a side surface of the machining head parallel to the traveling direction of the laser beam.

3. The additive manufacturing apparatus according to claim 2, wherein the through-hole penetrates the side surface in a direction perpendicular to the side surface.

4. The additive manufacturing apparatus according to claim 2, wherein a position of the through-hole facing the first pipeline is located closer to a plane of incidence of the laser beam in the machining head than a position of the through-hole facing an outside of the machining head.

5. The additive manufacturing apparatus according to claim 4, wherein
   the machining head further includes a gas supply nozzle having an internal flow path, and
   the gas supply nozzle is connected to the through-hole.

6. The additive manufacturing apparatus according to claim 1, wherein
   the machining head further includes a gas supply nozzle having an internal flow path,
   the gas supply nozzle is provided in a through-hole provided in a side surface of the machining head parallel to the traveling direction of the laser beam, and
   the gas supply port is an outlet of the gas supply nozzle.

7. The additive manufacturing apparatus according to claim 6, wherein an inlet and the outlet of the gas supply nozzle are located at a same position in the traveling direction of the laser beam.

8. The additive manufacturing apparatus according to claim 6, wherein a position of the outlet of the gas supply nozzle is located closer to a plane of incidence of the laser beam in the machining head than a position of an inlet of the gas supply nozzle in the traveling direction of the laser beam.

9. The additive manufacturing apparatus according to claim 1, wherein the machining head has a reduction part to reduce a cross-sectional area of the first pipeline in a stepwise manner in the traveling direction of the laser beam.

10. The additive manufacturing apparatus according to claim 1, wherein a Reynolds number is 10100 or less in a jetting port region of the gas supply port.

11. A machining head for irradiating a wirelike material with a laser beam, the material being fed from a wire nozzle onto a workpiece, and jetting shielding gas from a supply source of the shielding gas, the machining head comprising:
    a head body including a first pipeline and a gas supply port, the first pipeline having a cylindrical shape and extending in a traveling direction of the laser beam, the laser beam being passed through the first pipeline, the shielding gas from the supply source being supplied from the gas supply port to the first pipeline; and
    a gas jet nozzle provided at an end of the head body facing the workpiece and including a second pipeline, a diameter of the second pipeline being smaller on a side facing the workpiece than on a side facing the head body, wherein
    a distance from the gas supply port in the head body to a connection part is larger than a length of the gas jet nozzle in the traveling direction of the laser beam, the head body and the gas jet nozzle being connected at the connection part.

\* \* \* \* \*